(12) United States Patent
Manneschi

(10) Patent No.: US 10,216,395 B2
(45) Date of Patent: Feb. 26, 2019

(54) SYSTEM FOR CONFIGURING A PORTABLE DETECTOR

(71) Applicant: Costruzioni Elettroniche Industriali Automatismi S.p.A. C.E.I.A. S.P.A., Arezzo (IT)

(72) Inventor: Alessandro Manneschi, Arezzo (IT)

(73) Assignee: Costruzioni Elettroniche Industriali Automatismi S.p.A. C.E.I.A. S.P.A. (IT)

( * ) Notice: Subject to any disclaimer, the term of this patent is extended or adjusted under 35 U.S.C. 154(b) by 205 days.

(21) Appl. No.: 14/908,959

(22) PCT Filed: Aug. 5, 2014

(86) PCT No.: PCT/EP2014/066861
§ 371 (c)(1),
(2) Date: Jan. 29, 2016

(87) PCT Pub. No.: WO2015/018847
PCT Pub. Date: Feb. 12, 2015

(65) Prior Publication Data
US 2016/0170621 A1 Jun. 16, 2016

(30) Foreign Application Priority Data

Aug. 5, 2013 (FR) ...................... 13 57786

(51) Int. Cl.
*G06F 3/048* (2013.01)
*G06F 3/0484* (2013.01)
(Continued)

(52) U.S. Cl.
CPC ........... *G06F 3/04847* (2013.01); *G01D 5/20* (2013.01); *G01V 3/15* (2013.01); *G06F 3/0482* (2013.01);
(Continued)

(58) Field of Classification Search
CPC ............ G06F 3/04847; G06F 3/04817; G06F 3/0482; G06F 3/04842; G06F 3/04886
See application file for complete search history.

(56) References Cited

U.S. PATENT DOCUMENTS 5,487,104 A * 1/1996 Baals ................. H04M 1/2477
379/396
6,104,334 A * 8/2000 Allport .............. H04N 21/8186
340/12.28
(Continued)

OTHER PUBLICATIONS

Jonathan Oxer et al., "Ubuntu Hacks," Jun. 14, 2006, O'Reilly Media, Inc., § 48 (pp. 1-4). (Year: 2006).*
(Continued)

*Primary Examiner* — Dino Kujundzic
(74) *Attorney, Agent, or Firm* — Lerner, David, Littenberg, Krumholz & Mentlik, LLP

(57) ABSTRACT

The present invention relates to a system for configuring a detector, the system comprising: a programming unit remote from the detector and comprising a man/machine interface making it possible to define configuration data of the detector, a communication link between the programming unit and the detector, a controller in the detector, the controller making it possible to activate or deactivate at least one key of the detector.

21 Claims, 3 Drawing Sheets

Figure 1:
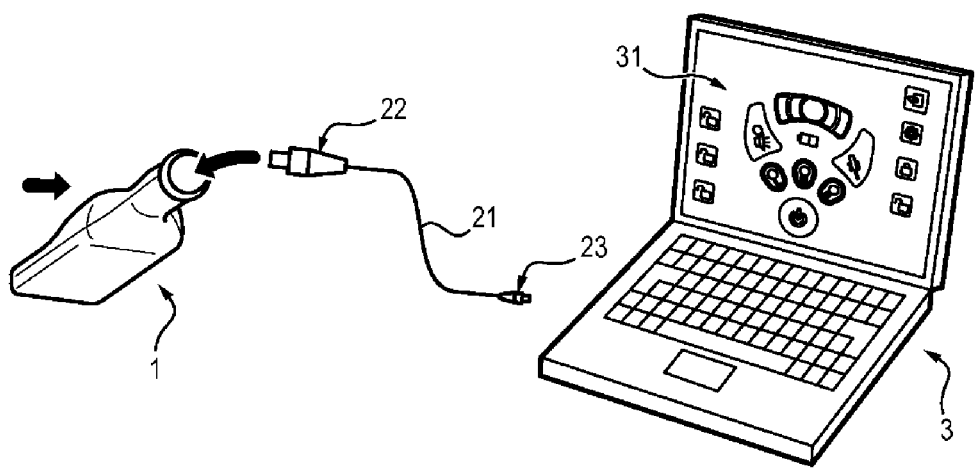

(51) Int. Cl.
*G01V 3/15* (2006.01)
*G01D 5/20* (2006.01)
*G06F 3/0481* (2013.01)
*G06F 3/0482* (2013.01)
*G06F 3/0488* (2013.01)
*G06F 3/14* (2006.01)

(52) U.S. Cl.
CPC ...... *G06F 3/04817* (2013.01); *G06F 3/04842* (2013.01); *G06F 3/04886* (2013.01); *G06F 3/14* (2013.01)

(56) References Cited

U.S. PATENT DOCUMENTS

| | | | |
|---|---|---|---|
| 8,411,039 B2 * | 4/2013 | Guo | G06F 3/0238 341/22 |
| 9,131,188 B2 * | 9/2015 | Song | H04N 5/44513 |
| 2002/0063691 A1 * | 5/2002 | Rogers | G06F 3/0219 345/168 |
| 2006/0050142 A1 * | 3/2006 | Scott | G08C 17/02 348/14.05 |
| 2009/0015372 A1 | 1/2009 | Kady | |
| 2009/0251417 A1 * | 10/2009 | Pate | G06F 3/0238 345/168 |
| 2009/0259321 A1 | 10/2009 | Stellari et al. | |
| 2010/0070903 A1 * | 3/2010 | Andell | A61C 1/0015 715/771 |
| 2010/0134338 A1 * | 6/2010 | Belz | G06F 3/0238 341/176 |
| 2011/0050478 A1 * | 3/2011 | Choi | G08C 17/02 341/176 |
| 2011/0109437 A1 | 5/2011 | Olsson | |
| 2012/0098667 A1 * | 4/2012 | McAdam | G01V 3/107 340/635 |
| 2012/0176405 A1 * | 7/2012 | Katsukura | F24F 11/0086 345/619 |
| 2013/0113648 A1 | 5/2013 | Duvoisin, III et al. | |

OTHER PUBLICATIONS

International Search Report for Application No. PCT/EP2014/066861 dated Sep. 1, 2015.

* cited by examiner

SYSTEM FOR CONFIGURING A PORTABLE DETECTOR

CROSS REFERENCE TO RELATED APPLICATIONS

The present application is a national phase entry under 35 U.S.C. § 371 of International Application No. PCT/EP2014/066861, filed Aug. 5, 2014, published in French, which claims priority from French Patent Application No. 1357786, filed Aug. 5, 2013, the disclosures of which are incorporated by reference herein.

The present invention concerns the general technical field of portable detectors, in particular for detecting metals.

PRESENTATION OF THE PRIOR ART

Portable devices for detecting metals are known.
Such devices generally comprise:
a handle for the gripping of the device by an operator, the handle including an autonomous electrical power source such as a cell or a battery, and
a head including:
  measuring means including an inductive transducer, such as a single winding coil, for measuring a generated inductance, and
  processing means including a microprocessor, such as an electronics board, for detecting the presence of metal parts and sending an alarm command to alerting means.

Such a portable detector can also comprise inputting means, such as a keyboard including keys, making it possible to program various functions of the detector. In particular, the inputting means can comprise:
  three keys relating to the detection sensitivity of the detector, each key enabling the activation of a different sensitivity level for the detector, such as low, medium and high sensitivity levels,
  a key for activating a visual alarm,
  a key for activating a vibrating alarm,
  a key for activating a sonic alarm.

The inputting means allow the detector described above to be multi-purpose. Specifically, the keys allow an optimal configuration of the detector according to the desired application. It is therefore possible to use one and the same detector for a large number of applications. This allows for mass production of the detector, the latter being suitable for a very large number of applications.

However, it can be preferable to simplify the detector by removing keys to facilitate the use of the detector.

Moreover, for applications where certain settings of the detector must meet a given technical specification—for example concerning the maximum sensitivity level of the detector—it can be useful to remove certain keys to limit the risk of unintentional reconfiguration of the detector by the operator.

There is therefore a need for a new portable detector with simplified use, simplified in particular by removing detector keys for switching on, switching off or setting the parameters of certain functionalities of the detector.

PRESENTATION OF THE INVENTION

For this purpose, the invention proposes a system for configuring a detector, such as a metal detector, optionally portable, including keys for controlling the functionalities of the detector, noteworthy in that the system comprises:

a remote programming unit of the detector including a human/machine interface for defining detector configuration data, which human/machine interface comprises virtual buttons representing the keys, each key being associated with a corresponding virtual button on the human/machine interface,
a communication link between the programming unit and the detector, the communication link allowing the transfer of configuration data from the programming unit to the detector,
a controller in the detector, the controller allowing the activation or deactivation of the keys controlling the functionalities of the detector from the configuration data such that:
  when a key is activated, its actuation by an operator incurs a modification of at least one functionality of the detector,
  when said key is deactivated, its actuation by an operator does not incur a modification of said at least one functionality of the detector,
and such that the configuration of the set of virtual buttons representing the keys on the human/machine interface makes it possible to define the configuration of the corresponding keys controlling the functionalities of the detector.

Thus, the fact of allowing the activation/deactivation of keys of the detector makes it possible to simplify the operating mode of a portable detector including a plurality of keys allowing it to respond to a large number of applications.

Moreover, the fact of carrying out this activation/deactivation of key(s) digitally using:
  a programming unit,
  a communication link, and
  a controller embedded in the detector,
facilitates the method of manufacturing of the detector, since it is not necessary to modify the hardware design of the detector to meet the requirements of a client.

Finally, the fact that the activation/deactivation of keys of the detector is carried out from a remote programming unit makes it possible to avoid risks of accidental activation/deactivation of keys from the portable detector.

In the context of the present invention, the term "functionality" of the detector is understood to refer to functions of the detector such as:
  powering up or powering down the detector,
  adjusting the detector sensitivity,
  switching on or switching off a vibrating component, a baffle or a diode for emitting a vibrating, sonic or light signal.

Preferred but non-limiting aspects of the system according to the invention are as follows:
  the relative positions of the virtual buttons in relation to one another are identical to the relative positions of the keys in relation to one another;
  the shape of each virtual button of the human/machine interface is identical to the shape of the key of the detector that is associated with it;
  the human/machine interface comprises at least one graphic icon for activating/deactivating at least one key, the actuation of the graphic icon allowing the generation of configuration data for activating/deactivating said selected key;
  the human/machine interface comprises at least one window for setting the parameters of at least one key selected by actuating its associated virtual button, the settings window allowing the generation of configuration data for the setting of the functionality controlled by said selected key;

the human/machine interface further comprises at least one virtual button allowing the storage, in a memory of the programming unit, of configuration data generated for a detector and their subsequent re-use for configuring another detector;

the communication link comprises a coaxial cable and connectors such as connectors of Universal Series Bus type, the connectors allowing the connection of the communication link to the programming unit on the one hand and to the detector on the other;

the detector comprises a handle including:
a housing open at its end, the housing being adapted to receive a battery of the detector, and
a cover to cover the open end of the housing,
the housing further including a connection plug such as a connection plug of Universal Series Bus type, to allow the connection of the detector to the communication link.

The invention also concerns a portable detector for its use in a system according to one of the preceding claims, the detector including a controller allowing the activation or deactivation of functionality control keys from configuration data such that:

when a key is activated, its actuation by an operator incurs a modification of at least one functionality of the detector, when said key is deactivated, its actuation by an operator does not incur any modification of said and at least one functionality of the detector, and such that the configuration of the functionality control keys of the detector is defined by the configuration of the set of virtual buttons representing the keys on a human/machine interface of a programming unit.

The invention also concerns a computer program product including a program code stored on a computer-readable data medium to execute the human/machine interface according to one of the preceding claims when the computer program is applied to a computer to be executed.

PRESENTATION OF THE FIGURES

Figure 2:
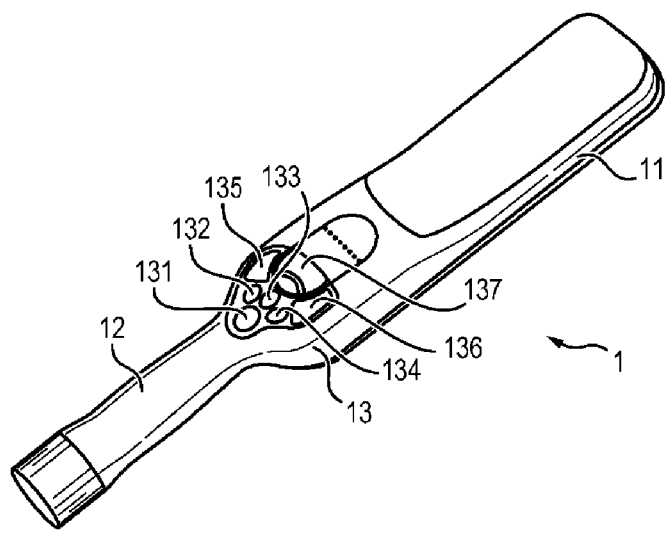
Figure 3:
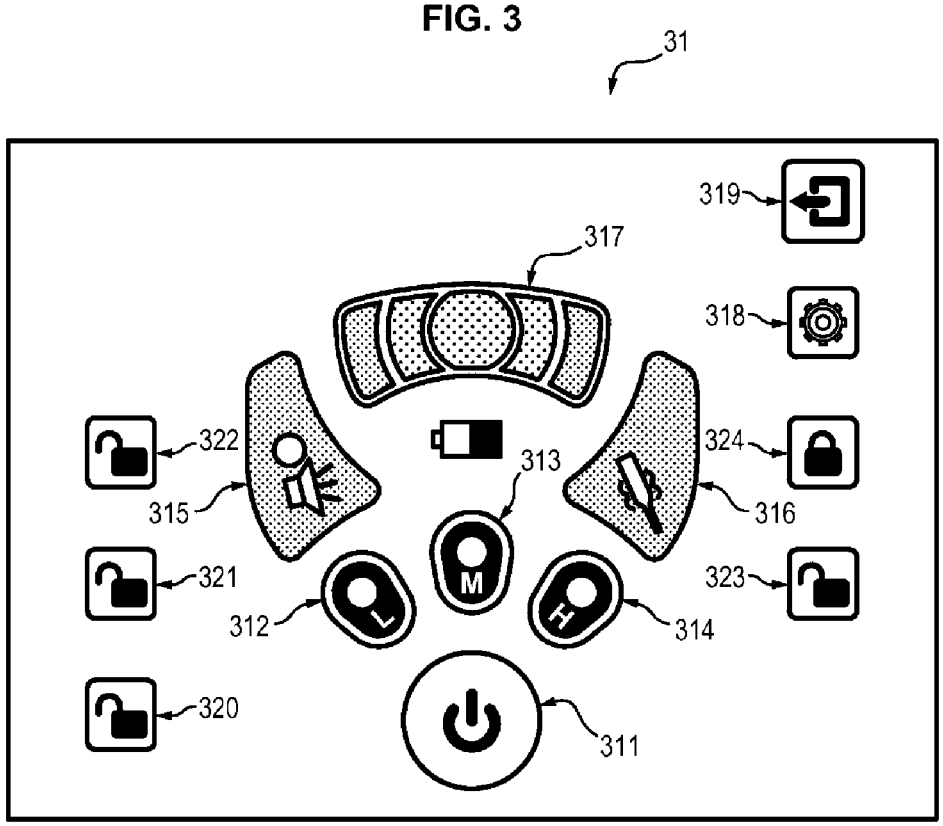
Figure 4A:
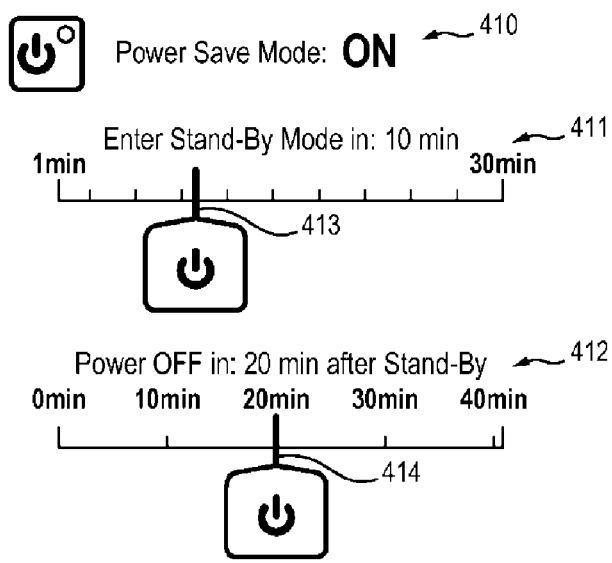
Figure 4B:
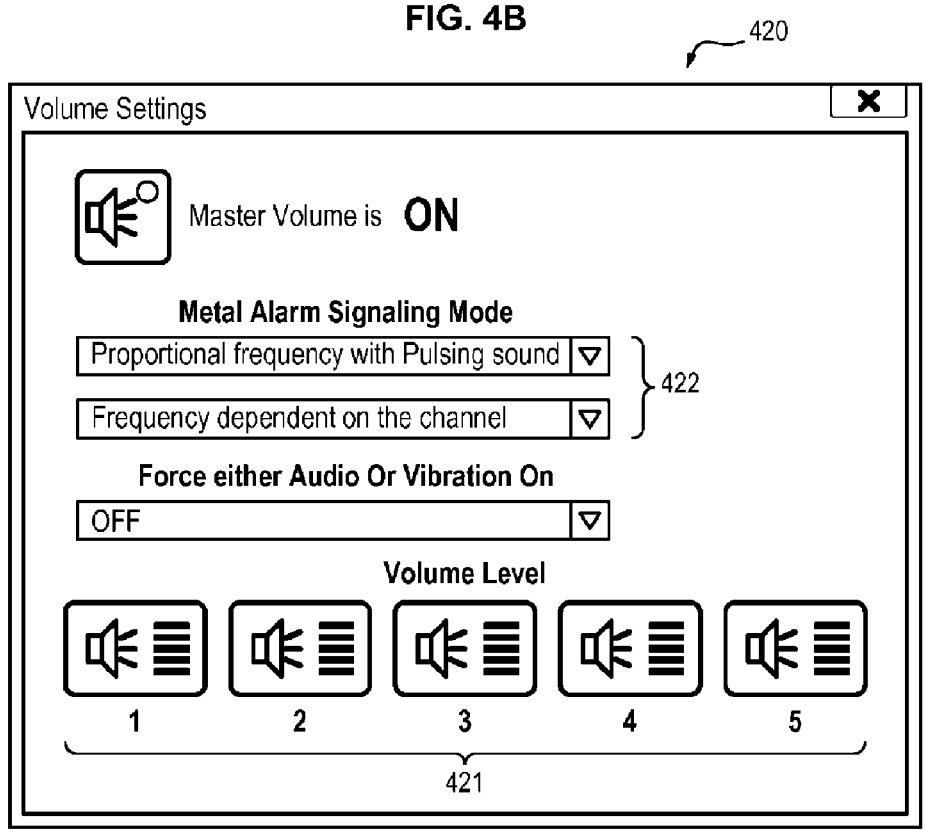

Other features, aims and advantages of the present invention will become further apparent from the following description, which is purely illustrative and non-limiting and must be read with reference to the appended drawings wherein:

FIG. 1 illustrates an example of a system for configuring a portable detector, FIG. 2 illustrates an example of a portable detector, FIG. 3 illustrates an example of a human/machine interface of a programming unit, FIGS. 4A, 4B illustrates an example of a settings window of a functionality controlled by a key of the portable detector.

DETAILED DESCRIPTION

We will now describe in more detail a system for configuring a portable detector with reference to the figures. In these different figures, equivalent elements bear the same reference numbers.

With reference to FIG. 1, we have illustrated an example of a system for configuring keys of a portable detector 1.

The configuration system comprises:
a programming unit 3 of the detector 1,
a communication link 2 between the programming unit 3 and the detector 1, and
a controller located in the portable detector 1.

This configuration system allows a user to configure a portable detector used by an operator.

1. Linking Unit

The linking unit 2 makes it possible to exchange data between the programming unit and the detector 1.

In the remainder of the text, only the exchanging of configuration data from the programming unit to the detector 1 will be considered.

However, it is obvious that other types of data can be exchanged, particularly data for perfecting the detector making it possible to update new functionalities in the detector, etc.

It is also obvious to the person skilled in the art that the exchanging of data can be done from the detector to the programming unit.

In a variant execution of the invention, the linking unit is an electrically conductive cable 21 including connectors 22, 23 at each of its ends for connecting the cable 21 to the programming unit 3 on the one hand, and to the detector 1 on the other. These connectors 22, 23 can be of USB connector type or coaxial connector type or any other type of connector known to the person skilled in the art.

In another variant execution of the invention, the linking unit 2 is of wireless type, and includes a transducer in the programming unit, and a transducer in the detector, the transducers exchanging data in the form of radio or infrared frequencies, etc.

2. Portable Detector

FIG. 2 illustrates an example of a detector 1 according to the invention. The detector comprises a head 11, a handle 12 and a body 13 between the head 11 and the handle 12.

2.1. Head

The head 11 of the detector includes an inductive transducer for measuring a generated inductance. The inductive transducer can be composed of one or more coils well known to the person skilled in the art.

In an embodiment, the inductive transducer is formed of a single coil constituting the transmitter and receiver.

In another embodiment, the transducer is formed of two coils forming respectively, and alternatively where applicable, the transmitter and the receiver.

In all cases, the coils preferably comprise several series loops of opposite directions for neutralizing the effects of external interference.

Moreover, the inductive transducer can advantageously comprise coils offset with respect to one another, both for transmission and reception, to limit the mutual inductance generated by the coils of the inductive transducer.

Of course the number of transmitter coils and the number of receiver coils is not limited to one or two. Moreover, the number of transmitter coils is not necessary identical to the number of receiver coils.

2.2 Handle

The handle 12 is composed of a tube forming a means for gripping the detector 1. The tube is hollow to house a battery of the detector. The hollow tube is open at its end opposite the head to allow the introduction/removal of the battery (not shown).

The handle 12 also comprises a female connector in the hollow tube to allow the connection of the detector to the communication link.

Finally, the handle 12 comprises a cover removable at its free end for covering the opening of the hollow tube. The cover is fixed to the hollow tube by screwing, clipping or any other fastening element known to the person skilled in the art. In the embodiment illustrated in FIG. 2, the cover comprises a circular plate and a skirt at its periphery, the inner wall of the skirt including a thread intended to cooperate with an additional thread arranged on an end portion of the outer wall of the hollow tube.

2.3. The Body

The body 13 comprises a programming unit such as an electronics board:
- to detect the presence of metallic particles as a function of the inductive signals measured by the inductive transducer, and
- to send an alerting command to an alarm of the detector.

The body 13 also comprises the alarm to which the alerting command is sent by the programming unit. This alarm can include:
- a vibrating component to make the detector vibrate when metal is detected, and/or
- a light-emitting diode to light up all or part of the detector when metal is detected, and/or
- a baffle to emit a sound when metal is detected.

The body 13 also comprises inputting means. These inputting means make it possible to configure the detector settings, and more precisely the functionalities of the detector.

The inputting means can be a keyboard, a touch-sensitive screen, or any other type of inputting means known to the person skilled in the art. In all cases, the inputting means comprise keys such as:
- push pins and/or switches when the inputting means are of keyboard type, or else
- graphic icons when the inputting means are of touch-sensitive screen type.

In the embodiment illustrated in FIG. 2, the inputting means comprise seven keys 131-137:
- a first key 131 located in a lower portion of the keyboard for switching the detector 1 on and off,
- second 132, third 133 and fourth 134 keys located above the first key 131 for adjusting the detection sensitivity between a low sensitivity, a medium sensitivity and a high sensitivity of detection,
- fifth 135 and sixth 136 keys located above the second, third and fourth keys 132-134, for respectively switching on or switching off the sonic alert functionality and the vibrating alert functionality,
- a seventh key 137 for respectively switching on or switching off the light-emitting alert functionality.

The body 13 lastly comprises the controller of the configuration system according to the invention. The controller makes it possible to command the hardware and software resources of the detector 1 as a function of the configuration data sent by the programming unit 3.

The controller is for example a microcontroller, a processor, or a microprocessor. Preferably, the controller is coupled to a memory of the detector to allow the storing of:
- configuration data coming from the programming unit, as well as
- initial configuration data stored in the portable detector when it is manufactured.

In all cases, the controller makes it possible to authorize or not authorize a command inputted by an operator actuating the keys of the keyboard as a function of the configuration data.

For example, if a user has generated configuration data commanding:
- the constant switching on of the vibrate function, and
- the deactivation of the key for switching the vibrating component on or off, then:
- the actuation by an operator of the sixth key 136 will not incur any modification of the state of the vibrate function (the vibrate function will therefore remain switched on.)

If on the other hand the user has generated configuration data commanding:
- the activation of the key for switching the vibrating component on or off, then:
- the actuation by an operator of the sixth key 136 will incur the switching on or switching off of the vibrate function.

3. Programming Unit

A more detailed description of an example of a programming unit is featured below, with reference to FIGS. 3 and 4.

The programming unit 3 allows a user to generate configuration data of the detector 1, particularly to activate/deactivate the keys 131-137 of the detector 1 and/or set the parameters of the functionalities of the detector 1.

In the embodiment illustrated in FIG. 1, the programming unit 3 is a personal computer specifically including a keyboard and a mouse, a display screen, a memory and a processor. Of course, the programming unit can also be a mobile telephone, an electronic tablet (such as an IPAD®), or any other type of terminal known to the person skilled in the art.

The programming unit 3 comprises a human/machine interface. This human/machine interface 31 comprises virtual buttons 311-319 representing various actions that the user can implement to configure the detector. The presence of a graphic human/machine interface 31 facilitates the selection by the user of the various functionalities to be set as well as the various keys of the keyboard to be activated/deactivated.

The human/machine interface 31 comprises virtual buttons 311-317 representing the keys 131-137 of the detector 1. Each virtual button 311-317 preferably has the same shape and the same relative position as the key 131-137 that it represents. This makes it possible to provide a programming unit 3 that is very intuitive and simple to use since the user easily understands the relationship that exists between the keys 131-137 of the detector 1 and the virtual buttons 311-317 of the human/machine interface 31.

The human/machine interface 31 also comprises graphic icons 320-324 associated with certain virtual buttons 312-316 and making it possible to activate or deactivate the corresponding key 132-136 on the detector 1.

In the embodiment illustrated in FIG. 3, five graphic icons 320-324 are each associated with a respective virtual button 312-316.

These graphic icons 320-324 each represent a padlock. This padlock is illustrated in the open position (reference number 323 for example) on the human/machine interface when the corresponding key of the detector must be activated. This padlock is illustrated in the closed position (reference number 324 for example) on the human/machine interface 31 when the corresponding key on the detector 1 must be deactivated.

The person skilled in the art will have clearly understood that the function of a graphic icon 320-324 is to activate or deactivate a key 132-136 of the detector, independently of the fact that the functionality associated with this key is switched on or off. For example, the sixth key 136 of the detector 1 associated with the command of the vibrate function can be:

- deactivated when the vibrate function is switched off; in this case, the vibrate function will still be switched on even if an operator actuates the sixth key 136 commanding the switching on or off of the vibrate function, or
- deactivated while the vibrate function is switched off; in this case, the vibrate function will always be switched off, even if an operator actuates the sixth key 136 of the detector, or
- activated; in this case, it is the actuation by the operator of the sixth key 136 commanding the vibrate function that will incur the switching on or off of its vibrate function.

FIG. 4 illustrates examples of settings windows. Each of these settings windows appears on the display screen when the user selects a particular virtual button.

For example, if the user selects the first virtual button, 311, the settings window 410 illustrated in FIG. 4A appears on the display screen. This settings window allows the user to define a standby period 411 and a power-down period 412 of the detector 1 when it is not in use. To do this, the settings window 410 comprises two slide rulers 413, 414 allowing the user to define a standby period 411 (for example 10 minutes after no use of the detector) and a power-down period 412 (for example 20 minutes after entering standby.)

If the user selects the fifth virtual button 315, the settings window 420 illustrated in FIG. 4B appears on the display screen. This settings window 420 allows the user to define settings relating to the sonic alarm, and in particular the intensity of the sonic signal emitted 421, as well as the emission mode 422 which can be:

- a so-called "constant" mode wherein the sonic signal emitted is continuous and its intensity is constant whatever the amplitude of the metal detection signal,
- a so-called "gradual" mode wherein the emission frequency of the sonic signal is a function of the amplitude of the metal detection signal.

Of course, other settings windows can appear during the selection of other virtual buttons by the user, these windows making it possible to set the parameters of:

- the low, medium and high sensibility levels associated with the second 132, third 133 and fourth 134 keys of the detector 1, or else
- the intensity of the vibration signal emitted by the vibrating component or else its vibrate mode (continuous, or frequency-based with a vibration frequency proportional to the amplitude of the metal detection signal),
- the intensity of the light signal emitted by the light-emitting diode or diodes or else their emission mode (in a single color, or in several colors, the color of the light signal varying as a function of the amplitude of the metal detection signal), etc.

Operating Principle

We shall now describe in more detail the operating principle of the configuration system according to the invention.

The user connects the portable detector to the programming unit using the communication link:

- the user removes the cover of the detector and takes out the battery then s/he connects the communication link to the detector,
- the user connects the other end of the link to the programming unit.

The user then configures the detector.

The user first chooses the functionalities of the detector that s/he wishes to activate, and those that s/he wishes to deactivate. The actuation of a virtual button corresponding to one of the keys of the detector makes it possible to activate or deactivate the functionality associated with said button. When the functionality associated with a button is activated, the virtual button is represented in color on the human/machine interface. When the functionality associated with a button is deactivated, the virtual button is represented in shades of grey on the human/machine interface.

The user then chooses to activate or deactivate the keys of the detector. The actuation of a graphic icon associated with a given virtual button makes it possible to activate or deactivate the corresponding key of the detector. When the padlock illustrated on the graphic icon is open, the corresponding key of the detector is activated. When the padlock illustrated on the graphic icon is closed, the corresponding key of the detector is deactivated.

The user then sets the parameters of the detector functionalities. By selecting certain of the virtual buttons, settings windows are displayed on the human/machine interface. The user then selects the settings for each of the functionalities in question.

Once all the configuration has been carried out, the user activates a virtual button allowing the generation of a machine code with the configuration data entered by the user on the human/machine interface. This machine code is then sent to the detector by way of the connection link. The machine code is stored in a memory of the detector. This machine code corresponds to a program of the controller.

Advantageously, the human/machine interface can comprise one (or more) virtual buttons 318 for storing the machine code or the choices made by the user to configure a detector in a memory of the programming unit 3. This makes it possible to re-use the machine code (or the choices made by the user) to configure other detectors without compelling the user to repeat his/her choices for each new detector of a series of detectors that s/he wishes to configure identically.

Thus, the configuration system according to the invention makes it possible to activate or deactivate one or more keys of the detector. It also makes it possible to set the detector functionalities according to the applications desired.

The reader will understand that many modifications can be made to the system described above without substantially departing from the teachings of the present document.

For example, the detector could be non-portable or concern the detection of other types of material than metal.

Moreover, the programming software implemented in the programming unit could be in the detector (used in this case as a web server.) In this last case, the operator should use a browser (Windows Explorer for example) to connect the detector and configure it (i.e. activation/deactivation of keys and setting of the functionalities).

This is why such modifications fall within the scope of h following claims.

BIBLIOGRAPHY

U.S. 2009/015372 describes a method for setting the operating parameters of a toot, with access code. It specifically proposes means for interrupting the supply of power to the tool after an operating time or at set times, and or only authorizing activation after inputting an access code, to protect the tool against theft. U.S. 2009/015372 is in no way concerned with configuring the keys of a device.

U.S. 2009/259321 describes a system for remote control of an electronic apparatus using a means defining a remote virtual interface. U.S. 2009/259321 is in no way concerned with configuring the keys of the electronic apparatus.

U.S. 2013/113648 describes a detector associated with a display device that makes it possible to display the results of the detection, for example the site of a detected object.

The invention claimed is:

1. A system for configuring a detector, such as a metal detector, including a set of keys for controlling functionalities of the detector, the system comprising:
  a remote programming unit of the detector including a human/machine interface for defining configuration data of the detector, which human/machine interface comprises a set of virtual buttons representing the set of keys, each key being associated with a corresponding virtual button on the human/machine interface,
  a communication link between the programming unit and the detector, the communication link allowing a transfer of configuration data from the remote programming unit to the detector,
  a controller in the detector, the controller allowing the activation or deactivation of the keys controlling the functionalities of the detector from the configuration data such that:
    when one of the keys is activated, its actuation by an operator incurs a modification of at least one functionality of the detector,
    when one of the keys is deactivated, its actuation by an operator does not incur a modification of the functionality of the detector, so that if the functionality controlled by said key does not switch off the functionality, while if the functionality controlled by said key was switched off prior to deactivation of said key, actuation of said key does not switch on the functionality,
  and such that a configuration of the set of virtual buttons representing the set of keys on the human/machine interface makes it possible to define a configuration of the corresponding keys controlling the functionalities of the detector; and
    wherein the human/machine interface comprises at least one graphic icon for activating/deactivating the at least one respective key, the graphic icon being associated to a respective key, actuation of the graphic icon allowing generation of configuration data for activating/deactivating said key,
    wherein the graphic icon represents a padlock, said padlock being illustrated in open position when the associated key of the detector is activated and in closed position when the associated key on the detector is deactivated.

2. The system according to claim 1, wherein the relative positions of the virtual buttons in relation to one another are identical to relative positions of the keys in relation to one another.

3. The system according to claim 1, wherein a shape of each virtual button of the human/machine interface is identical to a shape of the associated key of the detector.

4. The system according to claim 1, wherein the human/machine interface comprises at least one settings window for setting parameters of at least one key selected by actuating its associated virtual button, the settings window allowing the generation of configuration data for the setting of the functionality controlled by said selected key.

5. The system according to claim 1, wherein the human/machine interface further comprises at least one virtual button allowing storage, in a memory of the remote programming unit, of configuration data generated for a detector, and their subsequent reuse for configuring another detector.

6. The system according to claim 1, wherein the communication link comprises a coaxial cable and connectors such as connectors of Universal Series Bus type, the connectors allowing the connection of the communication link to the remote programming unit on the one hand and to the detector on the other.

7. The system according to claim 1, wherein the detector comprises a handle including:
  a housing open at one end, the housing being adapted to receive a battery of the detector, and
  a cover to cover the open end of the housing,
the housing further including a connection plug such as a connection plug of Universal Series Bus type, to allow connection of the detector to the communication link.

8. The system according to claim 1, wherein the remote programming unit further comprises a first additional virtual button allowing generation of a machine code with the configuration of the set of virtual buttons representing the keys on the human/machine interface.

9. The system according to claim 8, wherein the remote programming unit further comprises a memory and a second addition virtual button for storing the machine code or the configuration of the set of virtual buttons representing the keys on the human/machine interface inside the memory.

10. A detector for use in a system according to claim 1, the detector including a controller allowing activation or deactivation of a set of keys for controlling functionalities from configuration data such that:
  when one of the keys is activated, its actuation by an operator incurs a modification of at least one functionality of the detector,
  when one of the keys is deactivated, its actuation by an operator does not incur any modification of said at least one functionality of the detector, so that if the functionality controlled by said key was switched on prior to deactivation of said key, actuation of said key does not switch off the functionality, while if the functionality controlled by said key was switched off prior to deactivation of said key, actuation of said key does not switch on the functionality,
and such that a configuration of the set of keys of the detector is defined by a configuration of a set of virtual buttons representing the set of keys on a human/machine interface of a remote programming unit.

11. A system for configuring a detector, such as a metal detector, including a set of keys for controlling functionalities of the detector, the system comprising-:
  a remote programming unit of the detector including a human/machine interface for defining configuration data of the detector, which human/machine interface comprises a set of virtual buttons representing the set of keys, each key being associated with a corresponding virtual button on the human/machine interface,
  a communication link between the programming unit and the detector, the communication link allowing a transfer of configuration data from the remote programming unit to the detector,
  a controller in the detector, the controller allowing the activation or deactivation of the keys controlling the functionalities of the detector from the configuration data such that:

when one of the keys is activated, its actuation by an operator incurs a modification of at least one functionality of the detector, when one of the keys is deactivated, its actuation by an operator does not incur a modification of the functionality of the detector, so that if the functionality controlled by said key does not switch off the functionality, while if the functionality controlled by said key was switched off prior to deactivation of said key, actuation of said key does not switch on the functionality, and such that a configuration of the set of virtual buttons representing the keys on the human/machine interface makes it possible to define a configuration of the corresponding keys controlling the functionalities of the detector, wherein the set of keys controls at least one of the following functionalities: powering up or powering down the detector, adjusting a detector sensitivity, switching on or switching off a vibrating component, switching on or switching off a baffle, switching on or switching off a diode.

12. The system according to claim 11, wherein the relative positions of the virtual buttons in relation to one another are identical to relative positions of the keys in relation to one another.

13. The system according to claim 11, wherein a shape of each virtual button of the human/machine interface is identical to a shape of the associated key of the detector.

14. The system according to claim 11, wherein the human/machine interface comprises at least one graphic icon for activating/deactivating at least one key, actuation of the graphic icon allowing generation of configuration data for activating/deactivating said key.

15. The system according to claim 11, wherein the human/machine interface comprises at least one settings window for setting parameters of at least one key selected by actuating its associated virtual button, the settings window allowing the generation of configuration data for the setting of the functionality controlled by said selected key.

16. The system according to claim 11, wherein the human/machine interface further comprises at least one virtual button allowing storage, in a memory of the remote programming unit, of configuration data generated for a detector, and their subsequent reuse for configuring another detector.

17. The system according to claim 11, wherein the communication link comprises a coaxial cable and connectors such as connectors of Universal Series Bus type, the connectors allowing the connection of the communication link to the remote programming unit on the one hand and to the detector on the other.

18. The system according to claim 11, wherein the detector comprises a handle including:

a housing open at one end, the housing being adapted to receive a battery of the detector, and a cover to cover the open end of the housing, the housing further including a connection plug such as a connection plug of Universal Series Bus type, to allow connection of the detector to the communication link.

19. The system according to claim 11, wherein the remote programming unit further comprises a first additional virtual button allowing generation of a machine code with the configuration of the set of virtual buttons representing the keys on the human/machine interface.

20. The system according to claim 11, wherein the remote programming unit further comprises a memory and a second addition virtual button for storing the machine code or the configuration of the set of virtual buttons representing the keys on the human/machine interface inside the memory.

21. A detector for use in a system according to claim 11, the detector including a controller allowing activation or deactivation of a set of keys for controlling functionalities from configuration data such that:

when one of the keys is activated, its actuation by an operator incurs a modification of at least one functionality of the detector, when one of the keys is deactivated, its actuation by an operator does not incur any modification of said at least one functionality of the detector, so that if the functionality controlled by said key was switched on prior to deactivation of said key, actuation of said key does not switch off the functionality, while if the functionality controlled by said key was switched off prior to deactivation of said key, actuation of said key does not switch on the functionality, and such that a configuration of the set of keys of the detector is defined by a configuration of a set of virtual buttons representing the keys on a human/machine interface of a remote programming unit.

* * * * *